United States Patent
Levandoski et al.

(10) Patent No.: US 6,827,985 B2
(45) Date of Patent: Dec. 7, 2004

(54) CURABLE SILICONE COMPOSITIONS HAVING ENHANCED CURE-THROUGH-VOLUME

(75) Inventors: Michael P. Levandoski, Bristol, CT (US); Alfred A. DeCato, Novarese (IT)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 10/275,374

(22) PCT Filed: May 2, 2001

(86) PCT No.: PCT/US01/14235

§ 371 (c)(1),
(2), (4) Date: Nov. 4, 2002

(87) PCT Pub. No.: WO01/83568

PCT Pub. Date: Nov. 8, 2001

(65) Prior Publication Data

US 2003/0212229 A1 Nov. 13, 2003

(51) Int. Cl.$^7$ .............................. C08J 7/18; C08J 7/04; C08F 2/46; B05D 3/06
(52) U.S. Cl. .................. 427/515; 427/387; 522/65; 522/99; 522/148; 528/12; 528/22; 528/32; 528/38; 528/41; 525/477

(58) Field of Search .................. 427/387, 515; 522/65, 99, 148; 528/12, 22, 32, 38, 41; 525/477

(56) References Cited

U.S. PATENT DOCUMENTS

| | | | |
|---|---|---|---|
| 4,528,081 A | 7/1985 | Lien et al. | 204/159.13 |
| 4,675,346 A | 6/1987 | Lin et al. | 522/39 |
| 4,699,802 A | 10/1987 | Nakos et al. | 427/54.1 |
| 4,876,039 A | 10/1989 | Lo et al. | 264/4.7 |
| 5,013,577 A | 5/1991 | Wright et al. | 427/35 |
| 5,091,483 A | 2/1992 | Mazurek et al. | 525/477 |
| 5,300,508 A | 4/1994 | Valla et al. | 514/258 |
| 5,300,608 A | 4/1994 | Chu et al. | 528/14 |
| 5,384,340 A | 1/1995 | Hara et al. | 522/99 |
| 6,451,870 B1 * | 9/2002 | DeCato et al. | 522/99 |
| 6,538,045 B1 * | 3/2003 | Murphy et al. | 522/71 |

FOREIGN PATENT DOCUMENTS

WO    WO 99/67318    * 12/1999    .......... C08G/77/08

* cited by examiner

*Primary Examiner*—Jeffrey B. Robertson
(74) *Attorney, Agent, or Firm*—Steven C. Bauman

(57) ABSTRACT

A photocurable silicone composition which includes an additive which provides cure-through-volume of the overall composition. The additive is desirably a curable amino silyl-terminated polyorganosiloxane.

15 Claims, No Drawings

CURABLE SILICONE COMPOSITIONS HAVING ENHANCED CURE-THROUGH-VOLUME

This application is a 371 of PCT/US01/14235 dated May 2, 2001

FIELD OF THE INVENTION

The present invention relates to curable silicone compositions having enhanced cure-through-volume. More particularly, the present invention relates to curable silicone compositions incorporating as a property enhancing additive a curable amino functionalized silane or curable amino silyl-terminated silicone. Desirably the additive is an alkoxy/amino silyl-terminated polymer composition which is the reaction product of a silanol-terminated polyorganosiloxane and at least two end-capping silane components having different end-capping groups.

BACKGROUND OF RELATED TECHNOLOGY

Cure-through-volume (CTV) is an important property of photocurable silicone compositions. Conventional curable silicone compositions have been limited in their ability to cure through wide bond gaps or in potting applications requiring large depths. For example, CTV's of about 2 cm to about 5 cm are typical of conventional curable silicones. Additionally, the use of filler materials and pigments further impedes the ability of light curing sources to effectively penetrate the silicone compositions.

To enhance CTV's, conventional methods have focused on either reduction or elimination of filler and pigment additives, or on the use of polymers which are capable of curing through more than one curing mechanism. For example, one approach has been to use silicone polymers which are capable of both photo and moisture cure. While compositions containing such polymers have their own advantages, it would be desirable to have the ability to improve CTV without having to rely on secondary curing mechanisms and the specialized polymers which are generally used therefor. Decreasing or eliminating filler materials has not been a viable alternative because the overall physical properties of the cured polymers are compromised, often to the point of being commercially unacceptable. Thus, there is a need for photocurable silicone compositions which overcome the CTV limitations of conventional technology and which are capable of curing through greater depths without jeopardizing the structural integrity of the cured silicone and without the need for polymers which rely on secondary curing mechanisms to increase CTV. Moreover, it would be advantageous to have a photocurable silicone composition which is less sensitive to the level of fillers or to the opacity of the composition as a whole.

SUMMARY OF THE INVENTION

The present invention relates to photocurable silicone compositions having enhanced physical properties, and particularly increased CTV, due to the incorporation of a curable silicone-based additive. The curable silicone-based additive may be incorporated in amounts sufficient to provide enhanced CTV, elongation or other desirable properties. For example, incorporation of the additive in amounts of up to about 25% by weight of the total silicone composition, desirably in amounts of about 0.1% to about 15% by weight, and more desirably in amounts of about 1% to about 2%, provides greater depth of cure and wider bond-gap curing than similar compositions, including dual-curing silicone compositions, which do not incorporate the silicone-based additive.

In one aspect of the invention, there is included a photocurable silicone composition which contains a.) at least one photocurable silicone polymer; b.) a photoinitiator; and c.) at least one curable amino functionalized silicone or silane additive. Desirably the curable amino functionalized silicone additive includes a curable alkoxy/amino silyl-terminated polymer or polymer blend which is formed from the reaction of a silanol-terminated polyorganosiloxane with one or more end-capping silane components and desirably with at least two end-capping silane components having different end-capping groups.

In another aspect of the invention there is included a method of preparing a photocurable composition having enhanced cure-through-volume comprising the steps of (i) providing a photocurable silicone polymer and a photoinitiator; and (ii) incorporating therein a curable alkoxy/amino silyl-terminated polymer additive comprising the reaction product of at least one silanol terminated polyorganosiloxane and one or more end-capping silane components and desirably with at least two end-capping silane components having different reactive end-capping groups.

Another aspect of the invention includes a method of providing enhanced cure-through-volume (CTV) in a curable composition by applying the aforementioned silicone composition to a substrate and exposing it to sufficient light radiation to effectuate cure.

DETAILED DESCRIPTION OF THE INVENTION

Photocurable Silicone Component

The photocurable silicone component may be any photocurable silicone polymer. Among the useful photocurable silicone polymers are those described in U.S. Pat. Nos. 4,675,346, 4,528,081, 5,300,608 and 4,699,802, all of which are incorporated herein by reference.

More particularly, the reactive silicone polymers include those which conform to the general structure:

I

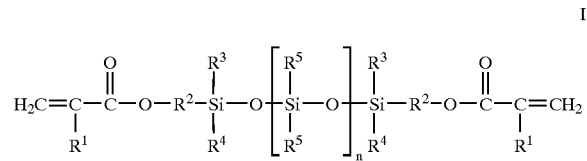

wherein $R^1$ is H or alkyl $C_{1-10}$, desirably methyl; $R^2$ is a divalent hydrocarbon or hydrocarbonoxy group such as alkylene, alkyleneoxy, alkenylene or arylene; the $R^3$ and $R^4$ may be the same or different and are $C_{1-10}$ monovalent hydrocarbon radicals which are desirably alkyl, substituted alkyl, aryl, substituted aryl, alkoxy, aryloxy, (meth)acrylic, oxime, acetoxy, N,N-dialkylamino, N,N-dialkylamino, N-alkylamido or,

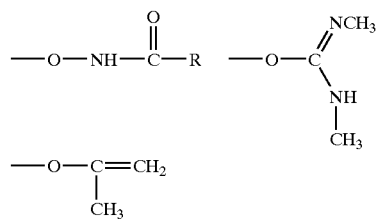

R is H or hydrocarbyl; $R^5$ is $C_{1-10}$ monovalent hydrocarbon radical and n is an integer between about 1 and 1200. $R^2$ is desirably alkylene or alkenylene $C_{1-3}$, such as propylene and propenylene. Examples of useful $R^3$ and $R^4$ groups are alkyls such as methyl and ethyl; halo alkyls, such as trifluoropropyl; phenyl and benzyl. In the case where moisture curing is desired $R^3$ and $R^4$ will desirably be hydrolyzable groups and most desirably methoxy groups.

These reactive silicone polymers are desirably made from a material having at least one end terminating in a silanol group. The process of preparing the photocurable silicone polymers includes reacting the aforementioned material having at least one end terminating in a silanol group with a silane containing at least one photocurable group, and desirably more than one photocurable group.

The silanes useful for preparing the photocurable silicone polymers may have the general formula:

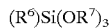    II wherein $R^6$ and $R^7$ can be identical or different monovalent hydrocarbon radicals having $C_{1-10}$; $R^6$ may also be a monovalent heterohydrocarbon radical having 1 to 10 carbon atoms wherein the hetero atoms are selected from the group consisting of halo atoms, O, N and S.

Desirably, $R^6$ and $R^7$ are selected from the group consisting of methyl, ethyl, isopropyl, vinyl, phenyl, methacryloxypropyl and norbornenyltrimethoxy; and $R^7$ is desirably selected from the group consisting of methyl, ethyl, isopropyl and $CH_2CH_2OCH_3$.

For example, one desirable silane is represented by the formula:

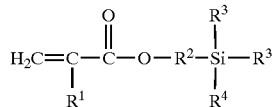

wherein $R^1$, $R^2$, $R^3$ and $R^4$ are as defined above.

Other polyalkoxysilanes useful in the present invention include:
$Si(OCH_3)_4$, $Si(OCH_2CH_3)_4$, $Si(OCH_2CH_2CH_3)_4$, $(CH_3O)_3SiCH_3$, $(CH_3O)_3SiCH_3$,
$(CH_3O)_3SiCH=CH_2$, $(C_2H_5O)_3SiCH=CH_2$,
$(CH_3O)_3SiCH_2—CH=CH_2$, $(CH_3O)_3Si[CH_2—(CH_3)C=CH_2]$,
$(C_2H_5O)_3Si(OCH_3)$, $Si(OCH_2—CH_2—OCH_3)_4$, $CH_3Si(OCH_2—CH_2—OCH_3)_3$,
$CH_2=CHSi(OCH_2CH_2OCH_3)_3$, $C_6H_5Si(OCH_3)_3$, $C_6H_5Si(OCH_2—CH_2—OCH_3)_3$,
$(CH_3O)_3Si[(CH_2)_3O—CH_2—CH—CH_2]$, $(CH_3O)_3Si[(CH_2)_3—Cl]$,

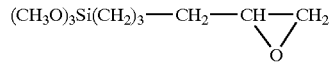

$(CH_3O)_3Si[(CH_2)_3OOC(CH_3)C=CH_2]$, $(C_2H_5O)_3Si(CH_2)_2CH_2—Cl$, $(CH_3O)_3Si(CH_2)_3NH_2$,
$(C_2H_5O)_3Si(CH_2)_3NH_2$, $(CH_3O)_3Si(CH_2)_3NH(CH_2)_2NH_2$,
$(C_2H_5O)_3Si(CH_2)_3NH(CH_2)_2NH_2$,
$(CH_3O)_3—Si(CH_2)_3SH$, $(CH_3O)_3Si[(CH_2)_3OOCH_2=CH]$, and

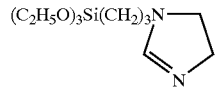

Primary, secondary and tertiary amino silanes are also contemplated. For example, n-methylaminopropyltrimethoxysilane, n-ethylaminopropyltrimethoxysilane, n-butylaminopropyltrimethoxlsilane, n,n-diethylaminopropyl-trimethoxysilane, n,n-dimethylaminopropyltrimethoxysilane are all found to be useful.

The aforementioned silane components are reacted with one or more silanol-terminated polymer components, which can be virtually any useful silanol-terminated material. Useful polymer components include from about 50 cps silanol-terminated polydimethylsiloxane, to about 150,000 cps silanol-terminated polydimethylsiloxane and combinations thereof. The silanol-terminated polyorganosiloxane has the general formula:

    II wherein A represents a polymer or copolymer backbone, which can be any number of combinations of polyurethane, silicone, polyamide, polyether and the like.

An example of one such silanol-terminated polymer backbone is polydimethylsiloxane having the formula:

    III

The number of repeating units will determine the molecular weight and hence the viscosity of this starting material. Thus, n can be, for example, an integer which, for example, can be from about 1 to about 1,200, desirably from about 10 to about 1,000. The viscosity of these materials is not critical and can easily be chosen to fit a particular product application, particularly because the terminated end product of this reaction will have substantially the same viscosity as the silanol-terminated reactant. Viscosities of these silanol-terminated polymer backbone can range from about 1 cps to about 150,000 cps (Brookfield, 25° C.). Desirably, the silanol-terminated polymer backbone used in the present invention is from about 50 to about 150,000 cps.

The reaction to make the photocurable silicone polymers is efficiently performed using a catalytically effective amount of a catalyst, and desirably of an organo-lithium reagent, as described in the aforementioned U.S. Pat. No. 5,300,608. The organolithium reagent can be represented by the formula:

$LiR^{14}$ 

wherein the organo group $R^{14}$ may be $C_{1-18}$ alkyl, aryl, alkaryl, arylalkyl, alkenyl, alkynl, an amine-containing compound, or an organosilicone-containing compound.

More particularly, if the organolithium reagent is an alkyl-lithium, it may be selected from methyl-lithium, n-butyl lithium, sec-butyl lithium, t-butyl lithium, n-hexyl lithium, 2-ethylhexyl lithium, and n-octyl lithium, among others.

Phenyl lithium, vinyl lithium, lithium phenylacetylide, lithium (trimethylsilyl) acetylide, lithium dimethylamide, lithium diethylamide, lithium diisopropylamide and lithium dicyclohexylamide are also useful catalyst reagents for forming the photocurable silicone polymer.

The organo group $R^{14}$ may also be $O(SiR^{11}R^{12}O)_t SiR^{11}R^{12}R^{13}$, wherein $R^{11}$ and $R^{12}$ are monovalent hydrocarbon radicals $C_{1-10}$; $R^{13}$ is $C_{1-18}$ alkyl or aryl; and t is an integer.

The catalyst used to prepare the photocurable silicone polymer is used in catalytically effective amounts, desirably from about 1 to about 1000 ppm based on the atomic weight of lithium.

The reaction process for making the photocurable silicone polymer includes the addition of the silanol terminated organosiloxane, end-capping silane and organo-lithium solution into a reactor vessel. The mixture is then heated with stirring and in the absence of moisture, for example under nitrogen conditions, for about ½ to about 5 hours at temperatures of from ambient to about 110 degree. C., desirably from 25° C. to about 60° C., or until end-capping has been completed. The mixture is then quenched with bubbled or liquid carbon dioxide or dry ice and further cooled. The formation of lithium carbonate can be easily removed, if desired, through filtration. Neutralization of the catalyst is optionally carried out, preferably with carbon dioxide in the form of dry ice. Acids may also be used for neutralization, as well as compounds such as silyl phosphate, silyl acetate and the like. Condensation moisture aids in the neutralization process. Volatile materials, if any, are vacuum stripped. Equimolar amounts of the silanol-terminated organopolysiloxane (based on the moles of SiOH functionality) and the end-capping silane can be used in the reaction, but excess end-capping silane is preferred. In the preparation of a one-part dual curing composition, it is preferred to add only a slight excess of end-capping silane to control the potential viscosity increase. Thus, for example, in such cases 1.0 to 1.5 moles of alkoxysilane is preferred for every mole of silanol.

The reactive silicone compositions of the present invention may also be cured using curing mechanisms or conditions other than photocuring conditions. For example, moisture curing, actinic radiation such as uv or visible light, heat, anaerobic cure or combination of these mechanisms may be employed.

The resultant fluid can then be mixed with other conventional additives such as fillers, initiators, promoters, pigments, moisture scavengers and the like to form a one-part curable composition. Fillers such as hydrophobic fumed silica or quartz serve to impart desirable physical properties to the cured material. Moisture scavengers such as methyltrimethoxysilane and vinyltrimethyloxysilane are useful.

Photoinitiator Component

The amount of photoinitiator used in the composition will typically be in the range of between about 0.1% and 5% of the composition. Depending on the characteristics of the particular photoinitiator, however, amounts outside of this range may be employed without departing from the invention so long as they perform the function of rapidly and efficiently initiating polymerization of the photocurable groups. In particular, higher percentages may be required if silicone bound photoinitiators are used with high equivalent weight per photoinitiating group.

It should also be understood that while the photoinitiator is used as a separate ingredient, the formulations used in the inventive method are intended to include formulations in which photoinitiating groups are included on the backbone of the same organopolysiloxane polymer which includes the photocuring groups discussed above. Preferred photocuring groups which may be attached to the organopolysiloxane include acrylate, methacrylate and glycidoxy groups.

Curable Property-Enhancing Additive Component

The curable property-enhancing additive may be an amino functionalized reactive silane, or more desirably is a curable amino silyl-terminated polymer or blend of such polymers. Most desirably the curable property-enhanced additive is one or more alkoxy/amino silyl-terminated polymer formed from the reaction of at least one silanol-terminated polymer with one or more end-capping silane components and desirably with at least two silanes having different end-capping components. This reaction desirably occurs in the presence of a catalyst. The catalyst reagent most desired may be any of the aforementioned organo-lithium reagents used to make the photocurable silicone polymer component described herein.

The curable alkoxy/amino silyl-terminated polymer additive may be a combination of reactive silicone polymers, but includes desirably a predominant amount of an alkoxy/amino silyl-terminated end-capped reactive polymer corresponding to the structure:

IV

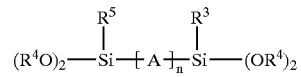

wherein A is a backbone portion selection from silanes, polyurethanes, polyesters and combinations thereof; n is an integer, for example, from 1–1,200; A is desirably a polyorganosiloxane represented by the repeating structure:

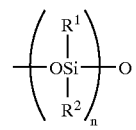

wherein $R^1$ and $R^2$ may be identical or different monovalent hydrocarbon radicals $C_{1-10}$; desirably $R^1$ and $R^2$ are methyl groups; $R^3$ and $R^5$ are different functional groups having up to 10 carbon atoms and are selected from (meth)acryl, amino (primary, secondary and tertiary amines), vinyl, alkoxy, aryloxy, acetoxy, oxime and combinations thereof; $R^3$ or $R^5$ may also be a monovalent heterohydrocarbon radical having up to 10 carbon atoms ($C_{1-10}$), wherein the hetero atoms are selected from O, N and S; $R^4$ is alkyl ($C_{1-10}$) and desirably methyl, ethyl or isopropyl; $R^4$ may also be —$CH_2CH_2OCH_3$.

The curable amino/silyl-terminated polymer additive of the present invention provides for various hybrid end-capping combinations. The curable silyl-terminated polymer additive components are termed "hybrid" because their reactive terminal ends are different. For example, one terminal silicon atom on the reaction product may have, directly or indirectly, alkoxy and amino functionality, while the other terminal silicon atom has, directly or indirectly, alkoxy and vinyl functionality. A particularly desirable reactive polymer formed by the process of the invention is a reactive silicone polymer having different end-capped groups which include a combination of amino, vinyl and alkoxy terminal functional groups.

The curable amino or alkoxy/amino silyl-terminated polymer additive may include a reaction product mixture which is a combination of a hybrid end-capped reactive silicone combination with non-hybrid end-capped reactive silicone. Desirably, the hybrid end-capped silicone is present in a predominant amount as compared to non-hybrid silicone reaction products, and more desirably the hybrid is present in a predominant amount relative to the total reaction product combination.

Formation of the curable alkoxy/amino silyl-terminated polymer additive is obtained by selecting predetermined amounts of each silane to obtain amino silyl-terminated, and desirably alkoxy/amino silyl-terminated polymers having different reactive end-capped groups. The silane or silanes having slower reaction rates are desirably provided in excess of the silane having a higher reaction rate. The relative amounts of each will vary depending on the silanes chosen. Desirably, the ratio of one silane to another is about 10:1 to about 1:10. In embodiments where three different silanes are added, a desirable ratio is about 1:2:1. Use of more than three silanes are also contemplated.

As previously mentioned, the curable alkoxy/amino silyl- or alkoxy/amino silyl-terminated polymer additive may be a blend of polymers formed from the reaction of at least one silanol-terminated polymer with at least two end-capping silane components having different reactive end-capping groups. This blend formed as the reaction product desirably has a predominate amount of a hybrid polymer as previously discussed. The amounts of each silane necessary to obtain a predominant amount of hybrid reaction product can be determined in advance. For example, prior to reaction, the hydroxy content of the silanol-terminated polymer component, e.g. silanol-terminated polyorganosiloxane, is determined by a suitable method. Based on the hydroxy content of the silanol-terminated component, the total amount of silanes, as well as the relative amounts of each, can be calculated to reach a predominant amount of the desired hybrid reaction product, or the desired ratio of different end-capping groups on the final reaction product. Desirably, the reaction products of the present invention comprise about 35% or more, and more desirably about 60% or more silyl-terminated polymers having different reactive end-capped groups. Other non-hybrid polymers having reactive end-groups may also be present. Desirably, care is taken in determining the relative amounts of the silane components, to account for differences in their reaction rates and ensure that no one silane is substantially unable to provide the desired end-capping. The total amount of the silane components are desirably sufficient to substantially complete the end-capping reaction of the silanol-terminated polymer or polymers. Desirably, about 0.5 moles to about 4.5 moles of the silane components are added for every mole of silanol-terminated polymer backbone component.

Aminopropyldimethoxy/vinyldimethoxy terminated polydimethylsiloxane polymers (hybrid DAM/VDM polymers) are examples of particularly desirable curable alkoxy/amino silyl-terminated polymer additives of the present invention. This polymer additive is formed from reacting aminopropylalkoxysilane (DAM) and vinyl alkoxysilane (VDM) with a silanol-terminated polydimethylsiloxanes in a formulation ratio of 17.67% by weight DAM to 82.33% by weight VDM, thereby producing a 1:1 molar ratio of the amino to the vinyl functionality in the reaction product. The resultant reaction product is represented by a predominant amount of the reactive polymer having the following structure:

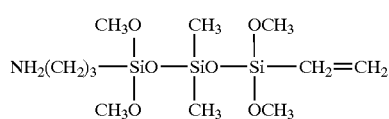

V

As examples of primary, secondary and tertiary amino silanes which can be used as the property-enhancing additive are n-methylaminopropyltrimethoxysilane, n-ethylaminoprpyltrimethoxysilane, n-butylaminopropyltrimethoxsilane, n,n-diethylaminopropyltrimethoxysilane and n,n-dimethylaminopropyl-trimethoxysilane.

The invention may be further understood with reference to the following non-limiting examples. Percent weights are per the total composition unless otherwise specified. Viscosities are measured using a Brookfield viscometer with either a spindle #6 or #4 at 10 rpm, 25° C., unless otherwise specified.

EXAMPLE I

A reactive silicone having the following composition was prepared in accordance with the aforementioned process:

| Composition A | |
|---|---|
| Components | Weight % |
| Methacryloxylpropyldimethoxy polydimethylsiloxane | 77% |
| Silicone oil poly(dimethylsiloxane) | 3.3% |
| Acrylic polymer | 5.5% |
| Silicone Dioxide | 3.3% |
| Photoinitiator | 3.3% |
| Modified Acrylamide | 2.2% |
| *Silane adhesion promoter | 3.3% |
| *Substituted silane moisture scavenger | 1.1% |

*Non-amino containing silanes

To Composition A was added the curable alkoxy silyl-terminated polymer additive in an amount of about 10% by weight of the total composition. This additive was a blend of alkoxy-silyl terminated reactive silicones, at least a predominate amount of which was vinyldimethoxy/aminopropyldimethoxy terminated polydimethylsiloxane.

The entire reactive silicone composition was placed into an aluminum weighing pan and UV cured at 70 mW/cm² (365 nm) for 1 minute. The cured sample was removed from the pan and any uncured material was removed from the cured sample. The CTV was measured to be 6.1 mm. This is to be compared to the initial (Composition A without the curable polymer additive) which had a CTV of 3.3 mm under the same cure conditions.

EXAMPLE II

Composition B, representing a conventional reactive silicone composition, was prepared having the following components:

| Composition B | |
|---|---|
| Component | Weight % |
| Methacrylate terminated Poly(dimethylsiloxane) | 49.5% |
| Vinyl terminated Poly(dimethylsiloxane) | 31% |
| Silicone oil poly(dimethylsiloxane) | 3% |
| Acrylate | 5% |
| Modified Silicone Dioxide | 4.5% |
| Photoinitiator | 1% |
| Modified Acrylamide | 2% |
| Silane adhesion promoter | 3% |
| Substituted silane moisture scavenger | 1% |

Composition B was considered a control sample. Four additional samples were made using different quantities of the hybrid additive vinyldimethoxy/aminopropyl-dimethoxy terminated poly(dimethyl-siloxane) added to Composition B. Each sample was placed into individual aluminum weighing pans and UV cured at 70 mW/cm² (365 nm) for 1 minute. Each cured sample was removed-from the pan and any uncured material was removed from the cured sample. The cured samples were then compared in CTV thickness to a cured sample of Composition B without an addition of the hybrid vinyldimethoxy/aminopropyl-dimethoxy terminated poly(dimethyl-siloxane) additive. The results from the five samples are shown in the Table I below.

TABLE I

| Sample | % Curable Amino Silyl-Terminated Hybrid Polymer Additive | CTV |
|---|---|---|
| 1 (Control) | None | 5.5 mm |
| 2 | 1.15% | 7.5 mm |
| 3 | 0.56% | 6.1 mm |
| 4 | 1.96% | 8.5 mm |
| 5 | 3.05% | 8.6 mm |

As can be seen from Table I, the incorporation of the curable silyl-terminated polymer additive significantly increased CTV as compound to the control.

EXAMPLE III

Composition C, representing a conventional reactive silicone composition was prepared having the following components:

| Composition C | |
|---|---|
| Component | Weight % |
| Methacrylate terminated Poly(dimethylsiloxane) | 66.5% |
| Vinyl terminated Poly(dimethylsiloxane) | 15% |
| Silicone oil poly(dimethylsiloxane) | 3% |
| Acrylate | 5% |
| Modified Silicone Dioxide | 3.5% |
| Photoinitiator | 1% |
| Modified Acrylamide | 2% |
| Silane derivative adhesion promoter | 3% |
| Substituted Silane moisture scavenger | 1% |

To Composition C was added aminopropyltrimethoxy silane at a 0.2% level in place of the curable hybrid vinyldimethoxy/aminopropyldimethoxy terminated poly(dimethy)siloxane to determine the effect on the cure through volume. This mixture was placed into an aluminum weighing pan and UV cured at 180 mW/cm² (365 nm) for 30 seconds. The cured sample was removed from the pan and any uncured material was removed from the cured sample. The samples cure through volume was then measured to be 8.3 mm thickness.

EXAMPLE IV

Composition D, representing a conventional reactive silicone composition was prepared having the following components:

| Composition D | |
|---|---|
| Component | Weight % |
| Methacrylate terminated Poly(dimethylsiloxane) | 70% |
| Vinyl terminated Poly(dimethylsiloxane) | 15% |
| Acrylate | 5% |
| Modified Silicone Dioxide | 3% |
| Photoinitiator | 1% |
| Modified Acrylamide | 2% |
| Silane derivative adhesion promoter | 3% |
| Substituted Silane moisture scavenger | 1% |

To Composition D was incorporated 1% of a the hybrid vinyldimethoxy/aminopropyldimethoxy terminated poly(dimethyl)siloxane additive. This mixture was placed into a aluminum weighing pan and UV cured at 180 mW/cm² (365 nm) for 30 seconds. The cured sample was removed from the pan and any uncured material was removed from the cured sample. The samples cure through volume was then measured to be 10.3 mm thickness.

EXAMPLE V

Composition E

The CTV of a UV curing adhesive composition having as its reactive silicone an acryloxymethyl-terminated poly(dimethyl-siloxane) was tested with and without the inventive additive of the present invention to determine effect on CTV. To Composition F was added 3.17% of the curable hybrid vinyldimethoxy/aminopropyldimethoxy terminated poly(dimethy)siloxane additive. Composition F without the additive was used as a control. Both samples were placed into separate aluminum weighing pans and UV cured at 70 mW/cm² (365 nm) for 30 seconds. The cured samples were removed from the pan and any uncured material was removed from the cured sample. The CTV of each sample was measured. Composition F with 3.17% of the hybrid curable polymer additive incorporated therein had a CTV of 4.95 mm, as compared to Composition F without the additive, which had a CTV of 4.70 mm.

What is claimed is:

1. A photocurable silicone composition comprising:
   a. a photocurable silicone polymer;
   b. a photoinitiator; and
   c. a curable amino silyl-terminated polymer additive comprising the reaction product of at least one silanol-terminated polyorganosiloxane and at one or more end-capping silane components.

2. The composition of claim 1 wherein said polymer additive is present in amounts sufficient to increase CTV as compared to the same composition without said additive.

3. The composition of claim 1 wherein said polymer additive comprises a predominant amount of a polymer corresponding to the structure:

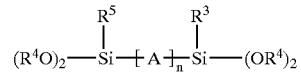

wherein A represents a polymer or copolymer backbone selected from the group consisting of polyurethane, silicone, polyamide, polyether, polyester and combinations thereof and n is an integer 1 to 1,200; $R^3$ and $R^5$ are different functional groups having up to 10 carbon atoms and are selected from (meth)acryl, amino, vinyl, alkoxy, aryloxy, acetoxy, oxime and combinations thereof, and either $R^3$ or $R^5$ may also be a monovalent heterohydrocarbon radical having up to 10 carbon atoms ($C_{1-10}$), wherein the hetero atoms are selected from O, N and S; $R^4$ is alkyl) ($C_{1-10}$) or —$CH_2CH_2OCH_3$.

4. The composition of claim 1 wherein said curable amino silyl-terminated polymer additive comprises vinydimethyoxy/aminopropyldimethoxy terminated polydimethylsiloyane.

5. The composition of claim 1 wherein said polymer additive is present in amounts of about 0.2–15% by weight of the total silicone composition.

6. The composition of claim 1, wherein said photocurable silicone polymer corresponds to the structure:

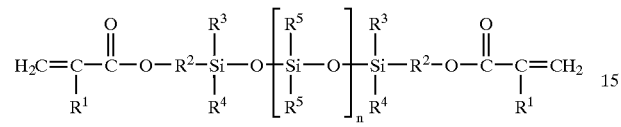

wherein $R_1$ is H or alkyl $C_{1-10}$; $R^2$ is a divalent hydrocarbon or hydrocarbonoxy group; $R^3$ and $R^4$ may be the same or different and are $C_{1-10}$ monovalent hydrocarbon radicals; $R^5$ is $C_{1-10}$ monovalent hydrocarbon radical and n is an integer from 1 to 1200.

7. The composition of claim 6, wherein said photocurable silicone polymer corresponds to the structure:

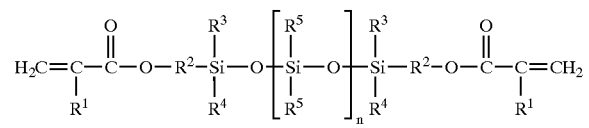

wherein $R^1$ is H or alkyl $C_{1-10}$; $R^2$ is a divalent hydrocarbon or hydrocarbonoxy group; $R^3$ and $R^4$ may be the same or different and are selected from the group consisting of alkyl, substituted alkyl, aryl, substituted aryl, alkoxy, aryloxy, (meth)acryl, oxime, acetoxy, N, N-dialkylamino, N,N-dialkylamines, N-alkylamido,

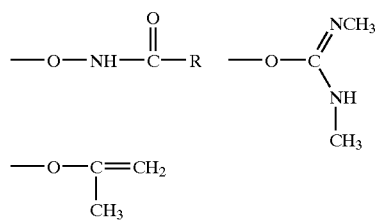

wherein R is H or hydrocarbyl and combinations thereof; $R^5$ is $C_{1-10}$ monovalent hydrocarbon radical and n is an integer from 1 to 1200.

8. The composition of claim 1, wherein the photocurable silicone composition is also moisture curable.

9. The composition of claim 1, wherein the photoinitiator is selected from the group consisting of benzoin, benzophenones, acetophenones and combinations thereof.

10. The composition of claim 8 further including a moisture curing catalyst.

11. A method of preparing a photocurable silicone composition having enhanced cure-through-volume comprising the steps of:
(i) providing a photocurable silicone polymer and a photoiniatiator; and (ii) incorporating therein a curable amino silyl-terminated polymer additive comprising the reaction product of at least one silanol-terminated polyorganosiloxane and one or more silane components.

12. A method of providing enhanced cure-through-volume in a photocurable silicone composition comprising the steps of:
(i) providing a photocurable silicone composition comprising:
  a. A photocurable silicone polymer;
  b. a photoinitiator; and
  c. a curable amino silyl-terminated polymer additive comprising the reaction product of at least one silanol-terminated polyorganosiloxane and one or more end-capping silane components;
(ii) applying said photocurable silicone compositions to a substrate; and
exposing said silicone composition to sufficient radiation to photocure said silicone composition.

13. A photocurable silicone composition comprising:
a. a photocurable silicone polymer;
b. a photoinitiator; and
c. a curable amino silyl-terminated polymer additive comprising the reaction product of at least one silanol-terminated polyorganosiloxane and one or more end-capping silane components, provided that at least one of the end-capping silane components is an amino containing component.

14. A method of preparing a photocurable silicone composition having enhanced cure-through-volume comprising the steps of:
(i) providing a photocurable silicone polymer and a photoiniatiator; and
(ii) incorporating therein a curable amino silyl-terminated polymer additive comprising the reaction product of at least one silanol-terminated polyorganosiloxane and one or more end-capping silane components, provided that at least one of the end-caping silane components is an amino containing component.

15. A method of providing enhanced cure-through-volume in a photocurable silicone composition comprising the steps of:
(i) providing a photocurable silicone composition comprising:
  a. a photocurable silicone polymer;
  b. a photoinitiator; and
  c. a curable amino silyl-terminated polymer additive comprising the reaction product of at least one silanol-terminated polyorganosiloxane and one or more end-capping silane components, provided that at least one of the end-caping silane components is an amino containing component;
(ii) applying said photocurable silicone compositions to a substrate; and
(iii) exposing said silicone composition to sufficient radiation to photocure said silicone composition.

* * * * *